Feb. 12, 1963
P. B. SHUTT ET AL
3,077,283
MASTER CYLINDER FILLER CAP
Filed July 27, 1960
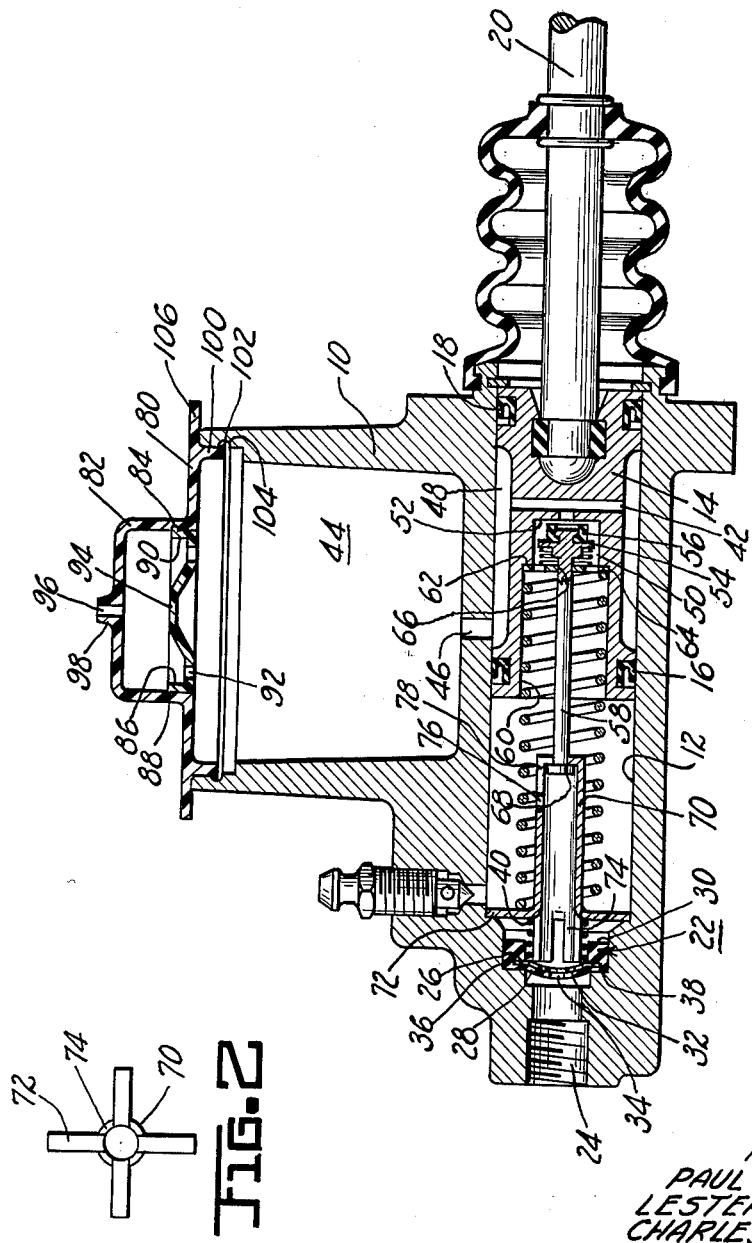
INVENTORS
PAUL B. SHUTT
LESTER J. LARSEN
CHARLES M. BARNES
SAMUEL F. PULLANO
BY
William P. Hickey
ATTORNEY 3,077,283
MASTER CYLINDER FILLER CAP
Paul B. Shutt, Lester J. Larsen, Charles M. Barnes, and Samuel F. Pullano, all of St. Joseph, Mich., assignors to The Bendix Corporation, St. Joseph, Mich., a corporation of Delaware
Filed July 27, 1960, Ser. No. 45,656
2 Claims. (Cl. 220—44)

The present invention relates to master cylinders and the like; and more particularly to a new and improved type of removable filler cap therefor.

An object of the present invention is the provision of a new and improved type of filler cap which can be inexpensively molded, which allows adequate breathing of the reservoir without loss of fluid therefrom, and which at the same time prevents the entry of dirt and water into the reservoir.

A further object of the present invention is the provision of a new and improved type of filler cap which can be simply and easily installed upon and removed from the open end of a reservoir of a master cylinder and the like.

The invention resides in certain constructions and combinations and arrangements of parts; and further objects of the present invention will become apparent to those skilled in the art to which the invention relates, from the description of the preferred embodiment described with reference to the accompanying drawing forming in part of this specification, and in which:

FIGURE 1 is a cross sectional view of a master cylinder embodying principles of the present invention; and FIGURE 2 is an end view of one of the parts seen in FIGURE 1.

The master cylinder shown in the drawing generally comprises a cast housing 10 having a longitudinally extending bore 12 therein from which fluid is forced by means of a spool-shaped hydraulic piston 14. The spool-shaped piston 14 has annular cup-shaped seals 16 and 18 located in suitable recesses in the ends of the piston for providing sliding sealing engagement with the sidewalls of the bore 12. The piston 14 is adapted to be forced inwardly of the bore 12 by means of a push rod 20 which is suitably received and retained in the outer end of the hydraulic piston 14. Forward or inward movement of the hydraulic piston 14 causes the fluid to be forced through a conventional residual pressure check valve structure 22 that is seated in the inner end of the longitudinally extending bore 12; and the fluid is thence delivered to a suitable outlet connection 24 which is normally connected to the hydraulic braking system of an automotive vehicle.

The residual pressure check valve structure 22 generally comprises a dish-shaped disc 26 having a rubber membrance 28 stretched over its outer surface and held in place upon the disc by thickened peripheral portions 30 which are snapped over and retained upon the outer peripheral edge of the disc 22. The disc member 26 has a plurality of holes 32 that are positioned slightly off center, and the rubber membrane 28 has a centrally located opening 34 positioned out of alignment with the openings 32, so that the membrane normally closes off the holes 32, and the disc normally closes off the opening 34. Fluid passing through the openings of the check valve structure forces the membrane away from the disc and thence flows through the central opening 34 of the membrane. The thickened outer peripheral portion 30 of the rubber membrane 28 has grooves 36 in its periphery so that return flow through the opening 24 forces the check valve structure away from the seat or shoulder 38 against which it is normally biased by a coil spring 40, and thence passes around the periphery of the check valve structure through the grooves 36.

The braking systems normally actuated by the type of master cylinder shown in the drawing expand somewhat during normal operation, so that additional fluid is required to be bled into the system to keep it full once the system is in its expanded condition. Compensting means are usually provided, therefore, for bleeding fluid to the longitudinally extending bore 12 after each brake application; and this is accomplished in the embodiment shown in the drawing by means of a normally open passageway 42 in the piston 14. A reservoir 44 having generally cylindrically-shaped sidewalls is formed integrally in the housing 10 in the region above the longitudinally extending bore 12; and a passageway 46 communicates reservoir 44 with the portion of the bore 12 that is always positioned between the seals 16 and 18. A transverse passage 48 in the piston 14 at all times communicates the passageway 46 with the compensating port 42, previously mentioned.

The compensating means seen in the drawing is completed by means of a poppet member 50 adapted to abut the flat valve seat 52 that surrounds the compensating port 42 to close off the port each time the piston 14 is actuated. The poppet member 50 has a metallic center portion 54 which is adapted to abut the valve seat 52 and thereby transmit most of the force which is exerted upon the poppet by hydraulic pressure to the piston 14 through metal-to-metal contact. The poppet member 50 further includes an annular rubber seal 56 which is suitably retained on the poppet 50 in a position surrounding the center portion 54, and which extends rearwardly of the end of the center portion 54 so as to be first engaged by the valve seat 52. The end of the annular seal 56 which first engages the seat 52 is rounded away from the center portion 54, so that the deformation of the seal which takes place, does not cause the seal material to flow between the center portion 54 and the valve seat 52.

The poppet member 59 must, of course, be free to move longitudinally of the bore with the piston 14 while at the same time being guided with respect to the compensating port 42 of the piston 14; and this is accomplished by means of an integral stem portion or rod 58 that is made integral with the poppet member 50. In the embodiment shown in the drawing, the valve seat 52 is formed at the bottom of an internal bore 60 in the piston 14, and this bore 60 is counterbored to provide a shoulder 62 against which a guide disc 64 for the rod is positioned. The rod 58 is, of course, guided by the sidewalls of a central opening 66 in the guide disc 64, and a plurality of suitable openings through the disc provide for the passage of fluid past the poppet structure. The opposite end of the rod 58 is flanged or headed as at 68 to serve as a guide for the opposite end of the rod and also limits outward movement of the poppet member 50. The head 68 is received in the bottom end of a generally cup-shaped tubular guide 70, and the opposite end of the guide 70 is supported relative to the sidewalls of the bore 12 by means of four fingers 72 formed by appropriately longitudinally slotting the tubular end of the guide structure 70 and bending alternate ones of the fingers so formed radially. The remaining fingers 74 which are formed by the slotting operation are permitted to remain in their axially extending direction, and so form a stop for the check valve structure 22, and a retainer for its biasing spring 40. A transverse slot 76 is provided in the sidewalls of the cup-shaped guide 70 to receive the head or flange 68 of the poppet stem 58, and a longitudinally extending slot 78 just wide enough to receive the stem 58 is formed in the base of the cup beneath the slot 76 to permit the stem 58 to be inserted sideways into the bottom of the guide 70. Once so positioned, the flange 68 is sufficiently guided by the internal sidewalls of the cup 70 to hold the poppet member 50 in suitable alignment with the valve seat 52.

According to principles of the present invention, the upper end of the reservoir 44 is closed off by means of a filler cap so formed as to be capable of being made in but two molded plastic parts which can be snapped together. In addition, the preferred embodiment shown in the drawing is formed in such a way that it can be quickly and easily snapped onto and off of the end of the reservoir. The filler cap shown in the drawing comprises a cap body section 80 having a generally cylindrically-shaped dome 82 which extends outwardly of the main portion of the body section 80. The sidewalls of the dome 82 are of generally the same thickness as the body 80 of the cap and an annular groove 84 is provided around the internal surface of the dome 82 just upwardly of the bottom surface of the main portion 80 of the cap. A molded plastic disc-shaped baffle 86 having a lip 88 is pressed up into the dome until the lip 88 slides into the groove 84 to retain the baffle in place. The cap section 80 and baffle 86 are preferably made of an inert and flexible plastic such as polypropylene; and in order that the baffle 86 will be flexible enough so that it can be snapped into position, and yet be rigid enough so that it will not come loose during use, the lip 88 is formed on a slight outwardly extending annular sidewall portion. For best results the sidewall portion 90 must neither be too long nor too short so that the desired retentive power of the baffle in the cap dome will be provided. The baffle of course has a number of openings 92 therethrough to permit the passage of air; and these openings 92 are positioned radially outwardly of an upwardly dish portion 94 so that any fluid that is splashed up through the openings 92 will drain back down again through these openings. Escape of air from the cap is provided by means of an opening 96 that is positioned upwardly from the baffle 86 out of alignment with the openings 92; and in the embodiment shown in the drawing, opening 96 is centrally located in a boss 98 so that water etc. which falls upon the cap will drain away from the opening 96.

The cap of course can be attached to the reservoir body in a number of ways as, for example, by threads on the outer sides of the reservoir body; but in the preferred embodiment shown in the drawing, is accomplished by means of a downwardly extending annular flange 100 having a lip 102 on its outer surface which is received in a corresponding groove 104 in the inner sidewalls of the reservoir chamber 44. One of the advantages of such construction is that thermal expansion of the plastic material during use causes the cap to be more firmly sealed instead of coming loose from the reservoir body. Another advantage is that oil which leaks past the lip 102 drains back down into the reservoir 44 when the cap is removed instead of leaking over the outside surface of the reservoir. The preferred construction shown in the drawing also has a radially extending flange 106 which overlies the end surface of the sidewalls of the reservoir to prevent dirt and water from slipping in past the cap, and at the same time provides a handle or surface against which a person's thumb can be positioned to press the cap upwardly and inwardly and so unlock the lip 102 from its receiving groove 104.

While the invention has been described in considerable detail, we do not wish to be limited to the particular construction shown and described; and it is our intention to cover hereby all novel adaptations, modifications and arrangements thereof which come within the practice of those skilled in the art to which the invention relates.

We claim:

1. A cap for use with a master cylinder reservoir or the like having a cylindrical wall with an annular groove in the inner face thereof: said cap comprising an annular body member having an opening therein, a generally cylindrically shaped dome portion enclosing said opening and integral with said body member, an annular groove in the inner face of the wall of said dome, a resilient baffle member having an upturned annular wall with an outwardly turned annular lip at the top thereof, said resilient baffle member annular lip being snapped into said last mentioned annular groove, said dome portion having a breather port in the top thereof, said baffle member having breather ports therein, a depending resilient annular skirt integral with said body member and spaced from the outer periphery thereof, said depending skirt extending in a generally perpendicular direction to said body member in a direction away from said body member and opposite to that in which said dome extends from said body member, an outwardly extending annular lip on the outer face of said depending skirt being adapted for snapping within the annular groove of said master cylinder, said space of said body member between said skirt and the outer periphery of said body member providing an annular flange on said body member.

2. The combination of a cap and master cylinder or the like: said master cylinder having a reservoir with an annular wall forming an inlet, said annular wall having an inwardly facing annular groove space from the top thereof; said cap comprising an annular body member having an opening therein, a generally cylindrically shaped dome portion enclosing said opening and integral with said body member, an annular groove in the inner face of the wall of said dome, a resilient baffle member having an upturned annular wall with an outwardly turned annular lip at the top thereof, said resilient baffle member annular lip being snapped into said last mentioned annular groove, said dome portion having a breather port in the top thereof, said baffle member having breather ports therein, a depending resilient annular skirt integral with said body member and spaced from the outer periphery thereof, said depending skirt extending in a generally perpendicular direction to said body member in a direction away from said body member and opposite to that in which said dome extends from said body member, an outwardly extending annular lip on the outer face of said depending skirt being snapped within the annular groove of said master cylinder, said flange engaging the top of said master cylinder reservoir wall.

References Cited in the file of this patent

UNITED STATES PATENTS

| | | |
|---|---|---|
| 560,227 | McKenzie et al. | May 19, 1896 |
| 1,249,268 | Willard | Dec. 4, 1917 |

FOREIGN PATENTS

| | | |
|---|---|---|
| 494,076 | Belgium | Mar. 15, 1960 |
| 492,994 | Canada | May 19, 1953 |
| 1,060,638 | France | Nov. 18, 1953 |
| 1,142,783 | France | Apr. 1, 1957 |